US005208742A

United States Patent [19]

Warn

[11] Patent Number: 5,208,742

[45] Date of Patent: May 4, 1993

[54] DATA LINE MONITORING SYSTEM

[75] Inventor: Walter E. Warn, Knightdale, N.C.

[73] Assignee: Progressive International Electronics, Raleigh, N.C.

[21] Appl. No.: 516,668

[22] Filed: Apr. 30, 1990

[51] Int. Cl.[5] .............................................. G06F 3/00

[52] U.S. Cl. .............................. 364/131; 364/229.5; 364/DIG. 1

[58] Field of Search ............... 364/131, 132, 133, 178, 364/478, 479, 229.41, 229.5, 138; 340/825.06

[56] References Cited

U.S. PATENT DOCUMENTS 4,872,541 10/1989 Hayashi ............................ 364/479
4,896,270 1/1990 Kalmakis ........................... 364/479

*Primary Examiner*—Jerry Smith
*Assistant Examiner*—Patrick D. Muir

[57] ABSTRACT

The present invention relates to a data signal monitoring system for monitoring data signals in a data wire without interrupting data signal flow. In the illustrative embodiment, the data signal monitoring system is connected to the data wires between a fuel dispenser and the the dispenser control console. The design is such that the data signals flow into the monitoring system without interrupting the communication between console and dispenser. The monitoring system interprets the data and analyzes pump status and commands. The data signal monitoring system translates the physical signals in the wire into serial signals which are sent to a microprocessor in the monitoring system for processing. The microprocessor then controls other electrical devices from information extracted from the communication between the pump and console. Such electrical devices include a price sign displaying the price of the fuel and an audio message system which is activated when the pump nozzle handle is lifted.

13 Claims, 7 Drawing Sheets

DATA LINE MONITORING SYSTEM

FIELD OF THE INVENTION

The present invention relates to a device and method for monitoring data signals, and in particular, data signals between fuel dispensers and the fuel dispenser control system.

BACKGROUND OF THE INVENTION

To provide fuel for motorized vehicles, there are numerous fuel outlet sites located throughout the industrial world. During recent years, there has been a trend toward the vehicle operator performing the fueling operation at so-called self service fueling sites. Often these self service fueling sites have a specialized fueling system where the dispensers are controlled by a remote dispenser control system. Generally, the dispenser includes a pump, a fuel supply nozzle, a flowmeter, a flow quantity signal generator, and a flow indicator. The pump has at one end a pipe connection to a fuel supply tank, and at the other end a hose connection to a fuel supply nozzle. The flowmeter measures the quantity of fuel being pumped, and the flow quantity generator generates a flow quantity signal from the flowmeter. The indicator indicates the quantity of fuel being pumped based on the flow quantity signal.

Typically at self service fueling sites, the dispensers are controlled by a remote dispenser control system located in a building at the fueling site, allowing the site attendant to control dispenser operation. The dispenser control system has electrical connections to the dispensers for transferring data signals. Generally speaking, the control system is a microcomputer for controlling dispenser function. The microcomputer has read-only-memory (ROM), read-and-write-memory (RAM), and input/output ports such that it can store information or read information applied at the ports. Specific functions of the control system microprocessor are well known to those skilled in the art. U.S. Pat. No. 4,550,859 relates to a microprocessor controlled system for controlling fluid dispensing pumps.

The microprocessor based dispenser control system may be in the form of a stand alone console, or it may be in the form of a logic module which interfaces with an electronic cash register or point-of-sales system. However, the principles involved are the same. While examples in this specification relate to a stand alone console, it is understood that the present invention relates to all remote dispenser control systems including consoles, point-of-sales interfaces, and card readers.

The dispenser control console sends data signals to the dispensers, and the dispensers sends data signals to the console. Data signals sent to the dispensers from the console include price per gallon to be charged at corresponding pumps, preset limits to be pumped at corresponding pumps, and pump authorization. Data signals sent from the dispensers to the console include pump identity (pump number), pump status, and dispensed fuel volume and value. Fuel volume may be for a single transaction, or totals for a given time period depending on the information requested by the console operator.

Briefly, the present invention relates to a data signal monitoring system for monitoring data signals in a data wire without interrupting signal flow. In the illustrative embodiment, the data signal monitoring system is connected to the data wires between the dispenser and control console. The design is such that data signals are monitored without interrupting the communication between the console and dispenser. The monitoring system interprets the data and analyzes pump status and commands. The monitoring system translates the data signals into serial signals which are sent to a microprocessor for processing. The microprocessor can then control other devices from information extracted from the communication between the dispensers and console.

All data signals between the dispensers and console enter the data signal monitoring system. It is desirable, however, to select certain data signals for processing, and to discard other data signals. This is accomplished by a program switch selector which instructs the microprocessor as to which signals to process, and which signals to discard. In a preferred embodiment of the illustrative example, the microprocessor extracts information relating to the price per gallon of the fuel, and relates this information to a large display sign at the fueling site so that potential customers can see the price of the fuel from a distance. In an alternate embodiment, the microprocessor extracts information relating to fueling process, i.e., it generates an output signal for indicating when the customer lifts the nozzle and activates the pump. This information may be used to activate audio devices, for example, instructions on the dispensing process or promotional messages. These are, however, to be taken as illustrative examples in that data can be extracted and used to control other devices relating to the fueling process.

SUMMARY OF THE INVENTION

In summary, the present invention relates to a data signal monitoring system for monitoring signals in a data wire without interrupting data signal flow. The system includes a configuration circuit, a microprocessor, and a program switch selector for instructing the microprocessor as to which data signals to process and which data signals to discard. The configuration circuit is attached to the wire to be monitored, and has an opto-coupler with light emitting diode and transistor for coupling the data wire to the microprocessor with ROM and RAM memory. This arrangement provides a method for coupling the data line to the microprocessor, yet the two are electrically isolated in that there is no direct wire connection. A program switch selector instructs the microprocessor as to which data signals to process, and which data signals to discard. The selected signals are processed by the microprocessor and an output is generated for controlling another device, or the information can be stored in a memory chip.

The primary object of this invention is to provide a data signal monitoring system which can monitor data signals in a wire without interrupting signal flow.

Another object of this invention is to provide a data signal monitoring system which can monitor data signals between a fuel dispenser and dispenser control system without interrupting communication between the two.

A further object of this invention is to provide a data signal monitoring system which can control other devices from the information extracted from the communication between dispenser and the dispenser controller.

A further object of this invention is to provide a data signal monitoring system which can control fuel price display signage from information extracted from fuel dispenser-console communication.

A further object of this invention is to provide a data signal monitoring system which can control audio message devices from information extracted from fuel dispenser-console communication.

BRIEF DESCRIPTION OF THE DRAWINGS

Other objects of this invention will appear in the following specification and claims, reference being made to the accompanying drawings which form a part thereof.

DETAILED DESCRIPTION OF THE INVENTION

Figure 1:
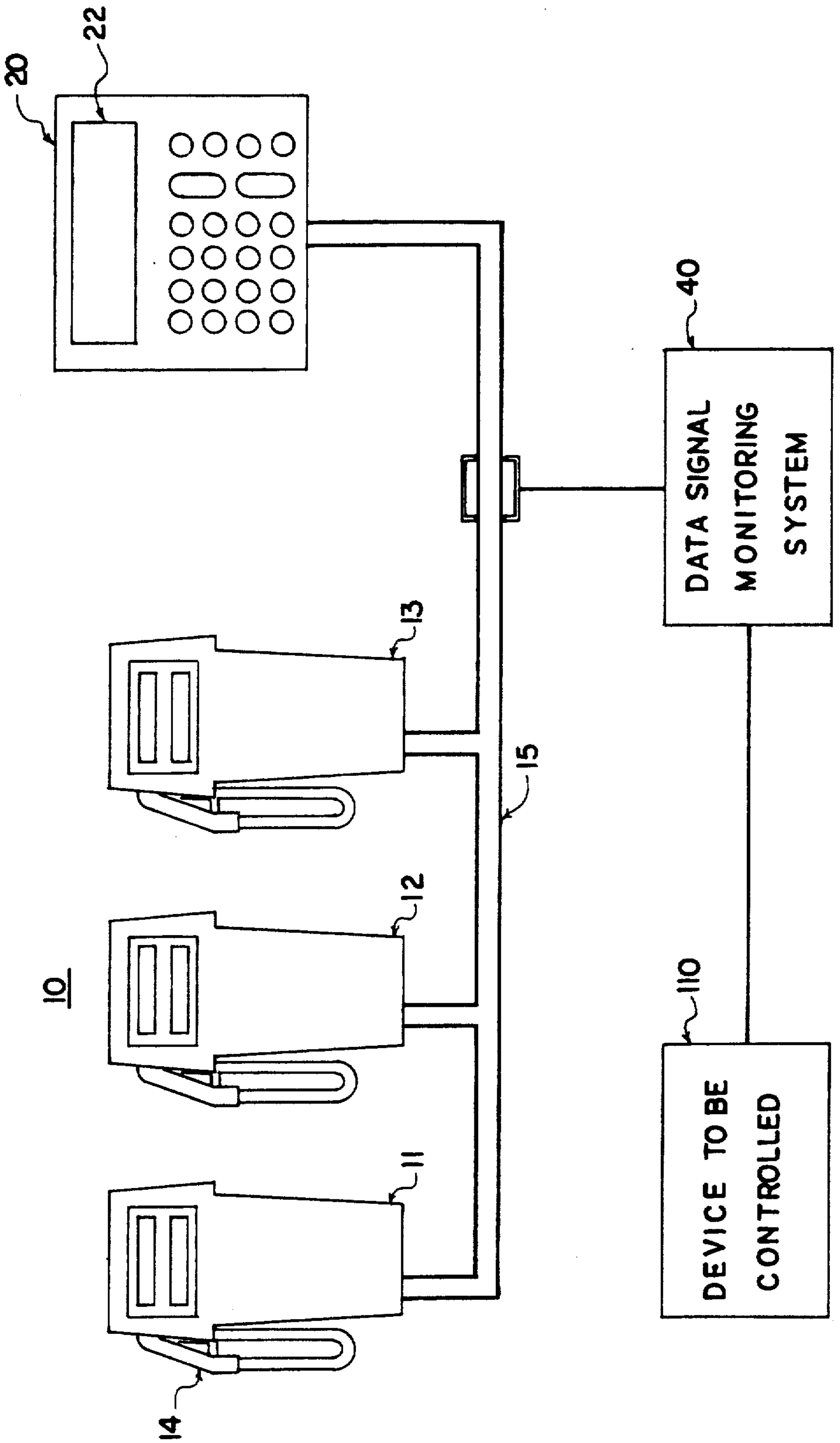
FIG. 1 is an overview schematic view of the dispensing pumps, control console, and data signal monitoring system incorporating the principles of the present invention.

Referring now to the drawings, and first to FIG. 1, there is shown a schematic overview of the fuel dispensing operation which includes a pump island (10) having three dispensers (11-13), and a dispenser control console (20) electrically connected to the dispensers by a plural data bus (15). The control console (20) controls the fuel dispensing process at individual dispensers (11-13). For this discussion, an example of three dispensers is used. In the industry, it is common for a console to control from two to thirty six dispensers. The principles involved are the same, and the three dispenser arrangement is to be taken only as an illustrative example.

There are presently several dispenser control systems used in the industry to control electronic and electromechanical dispensers. The dispenser control system may be a stand alone unit, for example console (20), or it may be interfaced to an electronic cash register or card reader. Typically on the console (20), there are a series of data input switches (21) having registers for entering information on the dispensing process, and an LCD display (22) for displaying information on the dispensing operation. Data signals from the console (20) to the dispensers (11-13) include price per gallon to be charged at the corresponding pumps (11-13), preset limits for fuel to be dispensed at pumps (11-13), and pump authorization (i.e., an activated mode whereby the pump will dispense fuel when the customer opens a valve in the pump nozzle). Simultaneously, data signals are being generated at the dispensers (11-13) for presentation to the console (20). These signals include pump number and status, and dispensed fuel volume and value for individual pumps. Data signal monitoring system (40) monitors the communication between console (20) and dispensers (11-13) without interfering with the data signal flow in data wire (15). Selected data signals are processed and used to control another device (110), which may be a fuel price sign, an audio message system, or this information may be stored in a memory chip.

During a fueling transaction, a customer pulls his vehicle along side one of the dispensers, for example dispenser (11). If the customer desires preset service, he relates this to the site attendant who enters the dollar value into the console preset switches (21). Otherwise, the attendant authorizes, or enables, the pump. Enabling occurs by activating relay contacts in the pump. The customer then removes nozzle (14), activates the pump (11) in a conventional manner by pump arming handle causing pump to reset, and inserts nozzle (14) into the fuel tank, not shown. At this point, the dispenser is fully activated and dispenses fuel when the customer opens the valve in nozzle (14). As fuel is dispensed, a metering signal is produced in a conventional manner, and pulses are transferred to the console (20) via wire connection (15).

Figure 2:
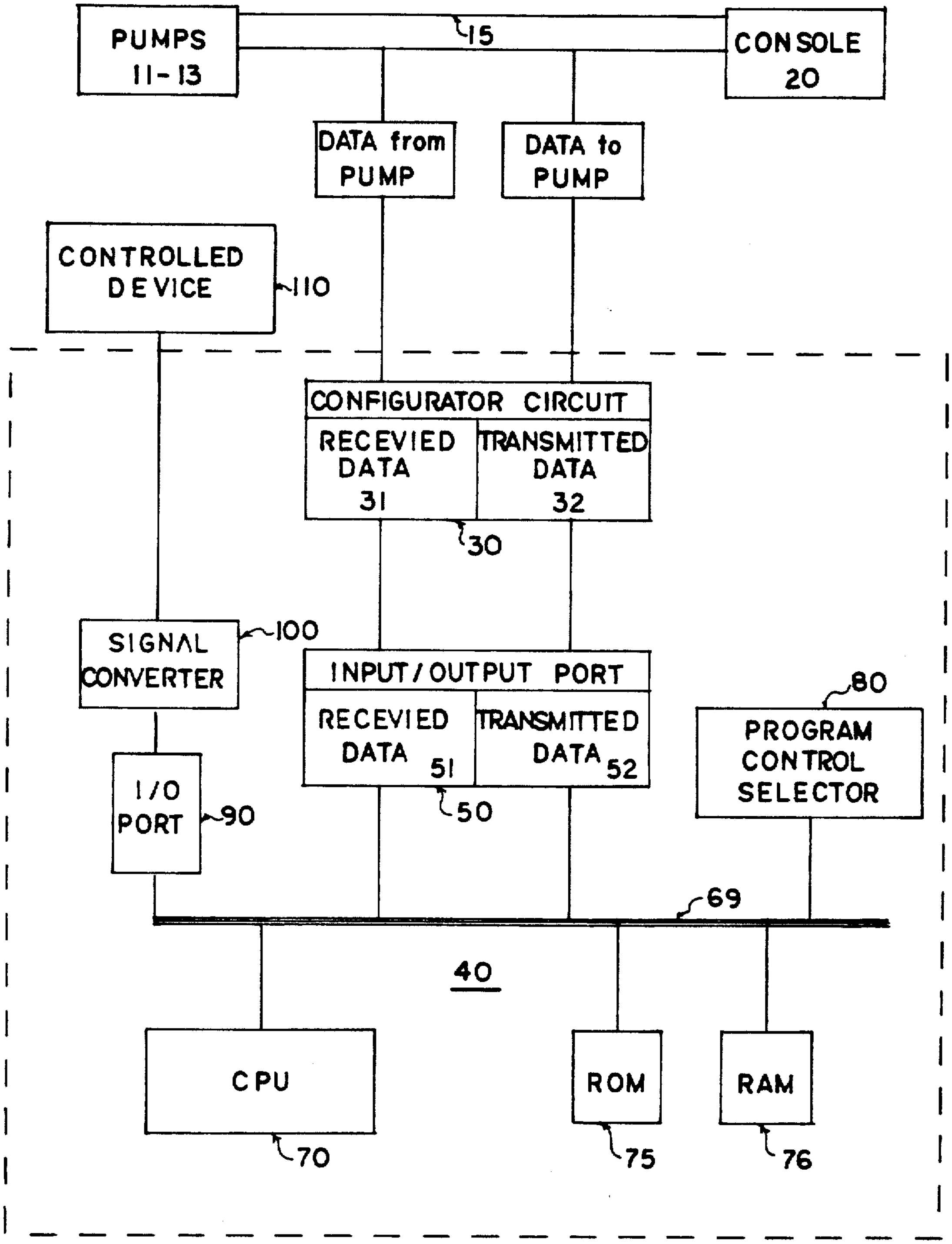
FIG. 2 is a schematic depiction of the components of the data signal monitoring system.

Referring to FIG. 2, there is shown a schematic diagram of the components of the data signal monitoring system, generally designated (40). Configuration circuit (30) is connected to data wire (15) between the dispensers (11-13) and console (20); the connection may be in series or parallel. As later discussed, the data signal monitoring system is coupled to, but electrically isolated from, the data wire (15), which allows the data current to be monitored without interrupting communication between the dispensers (11-13) and console (20). In the illustrative embodiment, there is a configuration circuit (30) for monitoring data signals from the dispensers (11-13) to console (20), and a configuration circuit (32) for monitoring data signals from console (20) to dispensers (11-13). However, the same results can be accomplished using a hardware design with a single configuration circuit design whereby both transmitted pump data and received pump data are monitored by a single configuration circuit utilizing the same principles. The two configuration circuit layout is used for illustration.

In essence, the configuration circuit (30) electrically isolates, but simultaneously couples the dispenser-console data signals to the microprocessor (70) for reading. The configuration circuit (30) is connected through input/out port, generally designated (50), to the microprocessor (70). More specifically, the configuration circuit (31,32) are connected to common bus (69) via received data port (51) and transmitted data port (52) respectively. Microprocessor (70) has read-only-memory, ROM (75), and read-and-write-memory, RAM (76), with conventional bus connections through common bus (69).

Program switch selector (80) is in addition connected through common bus (69). As previously stated, data signals from console (20) to corresponding dispensers (11-13) include price per gallon to be charged, preset limits for fuel to be dispensed, and pump authorization; data signals generated at the dispensers (11-13) for presentation to the console (20) include pump number and status, and dispensed fuel volume and value. Program switch selector (80) indicates to microprocessor (70) which data signals to process, and which data signals to discard. In a preferred embodiment, the program control selector (80) directs microprocessor (70) to monitor and process dispenser-console data signals relating to price per gallon of the fuel. In an alternate embodiment, the program selector (80) directs microprocessor (70) to monitor and process data signals relating to pump activation, i.e., when customer lifts nozzle (14) causing pump (11) to reset.

In response to program selector (80), the microprocessor (70) generates output signals to the controlled device (110). In a preferred embodiment, the controlled device is a large display sign located at the fueling site for indicating the price of the fuel. The present invention changes signage displays from data extracted from the dispenser-console data wire (15). In the illustrative embodiment, the signals from microprocessor (70) are converted to signals appropriate for sign control by signal converter (100) having connection to microprocessor (70) through input-output port (90).

Figure 3:
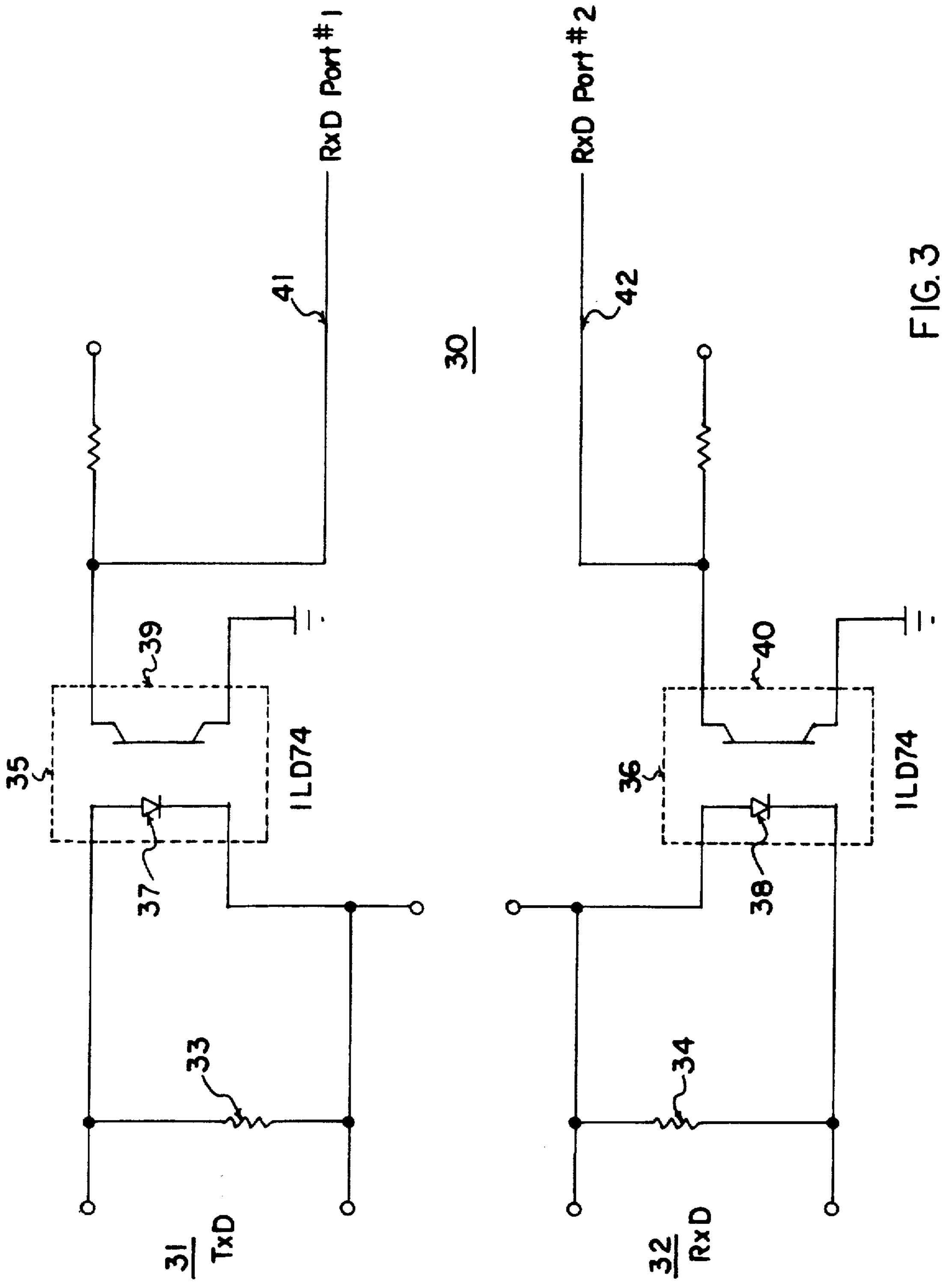
FIG. 3 is a schematic diagram of the configuration circuit.

Referring now to FIG. 3, there is shown a schematic diagram of the configuration circuit, generally designated (30). Identical circuits (31,32) are shown, and are connected to dispenser-console data wire 15), shown in FIG. 2. Circuit (32) monitors data signals sent to dispensers (11-13) from console (20), and circuit (31) monitors data signals sent from dispensers (11-13) to console (20). Circuits (31,32) have opto-couplers (35,36), respectively, which allow the monitoring system (40) to monitor the data line (15) without interrupting communication between dispensers (11,13) and console (20). In effect, the configuration circuits (31,32) translate the data signals into computer readable signals, for example, transistor-transistor logic signals, which are sent to the microprocessor (70) for reading. The opto-couplers (35,36) electrically isolate the monitoring (40) from the data line (15). Opto-couplers (35,36) sample the data flow through the light emitting diodes (37,38), and this information is transferred to the opto-coupler transistors (39,49). Transistors (39,49) generate signals in voltage form, i.e. computer logic signals, which are transferred to microprocessor (70) through input/output port (50), shown in FIG. 4. Connections (41,42) connect the transistors (39,49) to input/output port (50). During operation, for example, transistors (39,49) may apply five volts to the microprocessor (70) for a high signal bit, and zero volts for a low bit signal; other voltage levels could apply. Configuration circuit (30) has a per conventional baud rate output chip, not shown, with connection to input-output port (50), seen in FIG. 4, for synchronizing signal flow.

In the illustrative schematic diagram in FIG. 3, there is shown two identical configuration circuits, generally designated (30), used in a data line monitoring system (40) where the dispensers (11-13) and control console (20) are communicating in current loop communication protocol, commonly used in the industry by certain dispenser manufacturers. The opto-couplers (35,36) electrically isolate the monitoring system (40) from the data line (15), i.e. there is direct wire connection between the two thus allowing the data current to be monitored without interruption. Referring to the opto-couplers (35,36) in FIG. 3, there is shown model numbers ILD74 (commercially available from Seimens Corporation), and an illustrative example of opto-couplers used in the present invention. The opto-couplers (35,36) sample the data signal current through the light emitting diodes (37,38), and this information is transferred to the opto-coupler transistors (39,49), which in turn generate computer readable signals (for example TTL signals) which are presented to the microprocessor (70) for processing. Other type logic signals could be used. As previously discussed, in the illustrative example circuit (31) monitors data signals from the dispensers (11-13) to console (20), and circuit (32) monitors data signals from the console (20) to the dispensers (11-13). A single circuit could monitor both transmitted and received data signals.

Depending on the hardware, other data line monitoring systems can be built using similar principles, for example using CMOS, NMOS, and related logic. The design of the system depends on the communication protocol used between the dispensers and dispenser controller. With current loop communication, the above described design would be used. Another type communication commonly used in the industry is voltage level. With this type communication, a comparator would be used in the configuration circuit in place of the opto-coupler. Comparators are commercially available and well known to those skilled in the art.

Referring to FIG. 3 and the hardware arrangement used in a system monitoring current loop communication between the dispensers and controller, there is shown resistors (33,34) connecting between the wires which enter and exit the LEDs (37,38). In the industry it is common to have forty milliamps of current in the data line. By using resistors (33,34) one can reduce the amount of current entering the LEDs (37,38) to, for example, twenty milliamps. The use of resistors would depend upon the amount of current in the data line, and the current level one desired to enter the LED of the configuration circuit.

Figure 4:
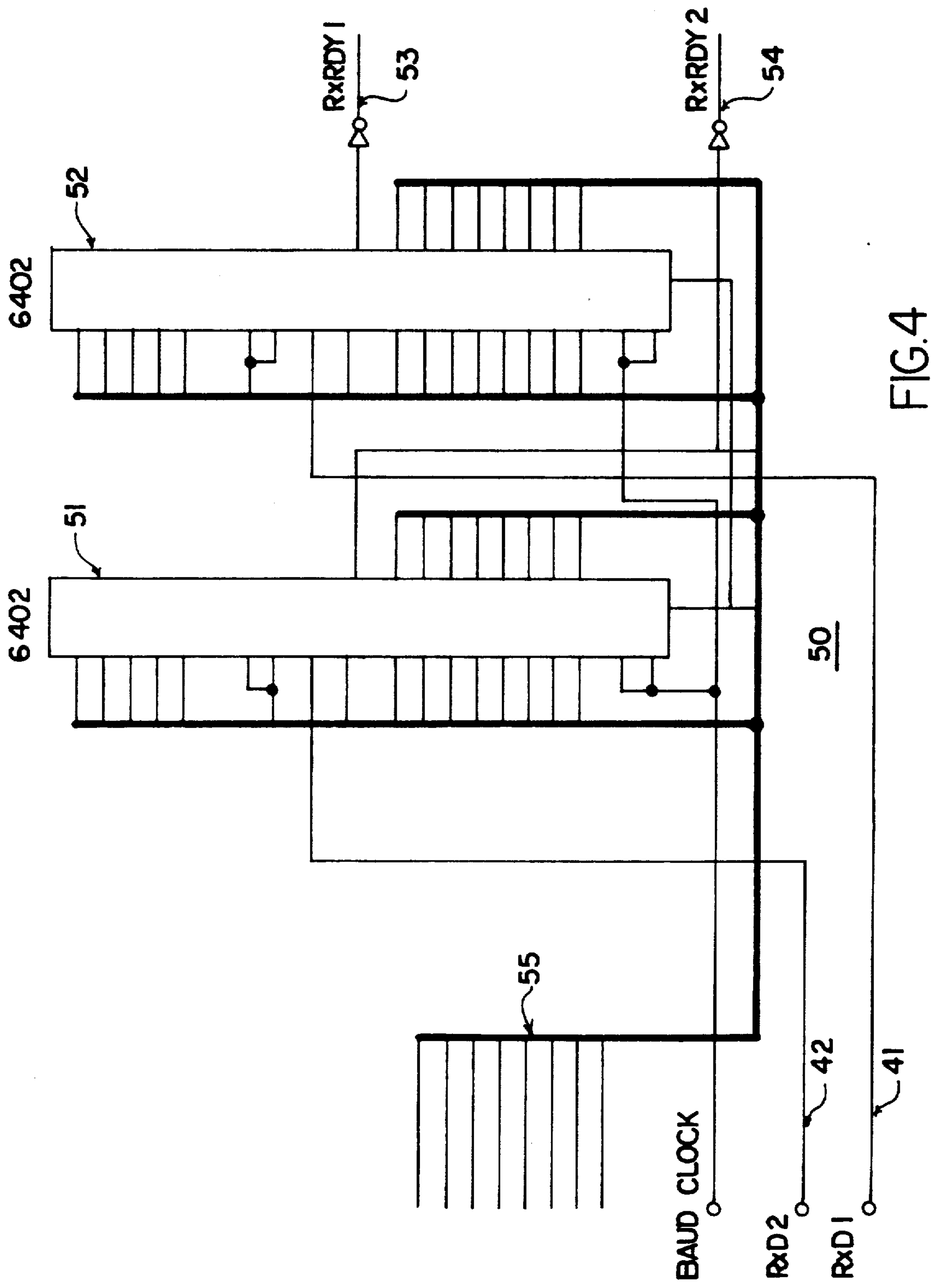
FIG. 4 is a schematic diagram of the serial input-output section between configuration circuit and microprocessor.

Referring now to FIG. 4, there is shown an example of a serial input/output section, generally designated (50), connecting configuration circuit (30) to microprocessor (70). Input/output section (50) includes UART chips (51,52) for sending interrupt signals through connections (53,54) to microprocessor (70), and data signals to microprocessor (70) through bus (55). UART chips are commercially available, and well known in the art.

The microprocessor (70) of the data monitoring device (40) operates in a per conventional manner. Specific implementations of the microprocessor (70) are well known to those skilled in the art, and include for example, integrated circuits manufactured and sold by INTEL, which include ROM (75) and RAM (76) memory. Program control for the microprocessor (70) is stored in ROM (75), and is set forth in flow chart form in FIG. 8. The computational programs are stored in RAM (76), and is set forth in flow chart form in FIG. 7.

Figure 5:
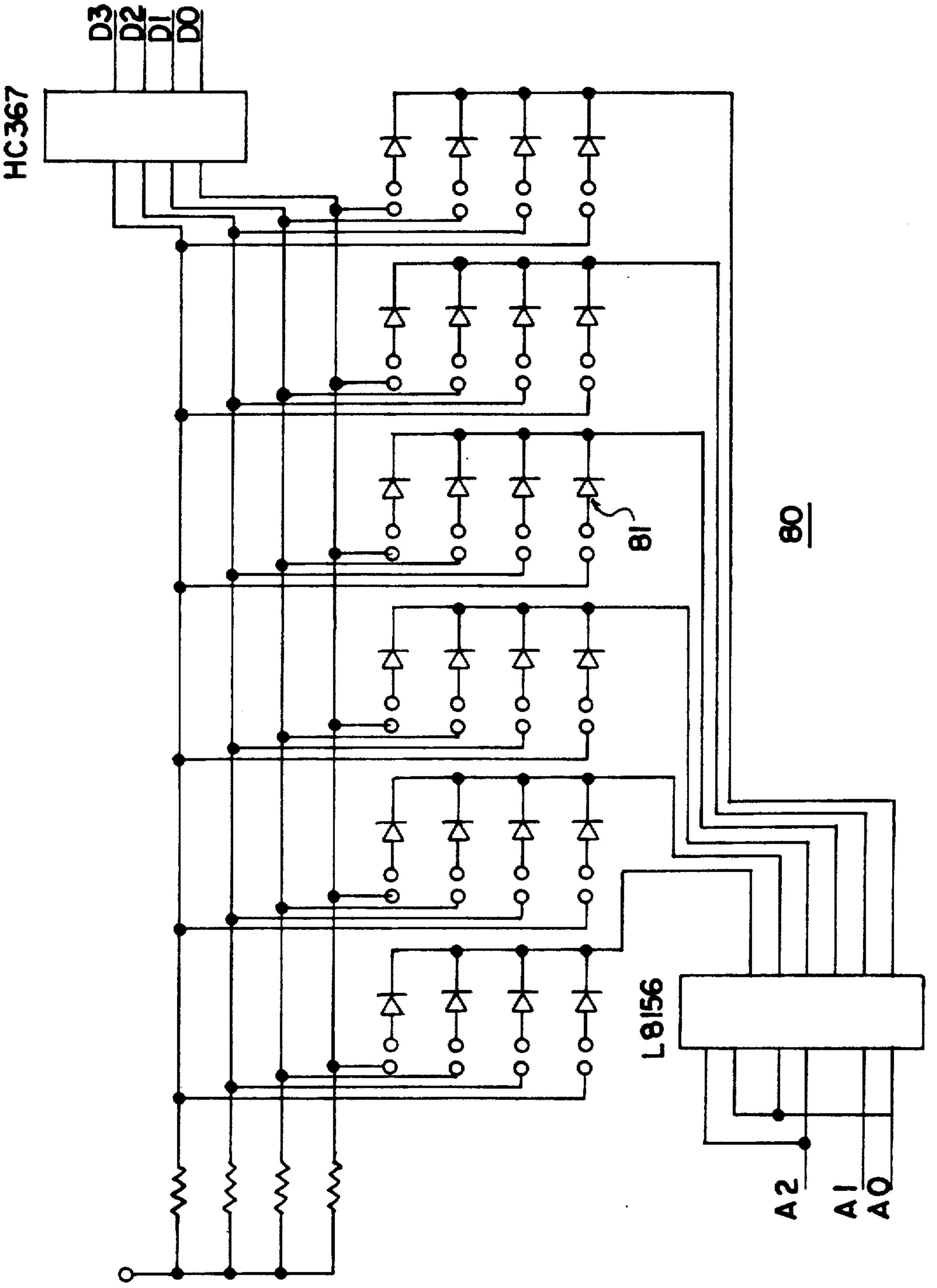
FIG. 5 is a schematic diagram of the program switch control input section.

Referring now to FIG. 5, there is shown the program switch selector (80). As previously stated, there are several data signals flowing between the dispensers (11-13) and console (20), and thus into the signal monitoring device (40). Program switch selector (80) determines which signals are processed, and which signals are discarded. The signal monitoring device (40) is preprogrammed as to which signals are to be processed. The program switch selector (80) is a matrix of diodes, generally designated (81), forming in the illustrated embodiment, three circuits; two circuits per numerical to be displayed. Program switch control (80) communications with microprocessor (70) through bus (69). In a preferred embodiment, the dispenser-console data signals monitored are the price per gallon of the fuel. The microprocessor (70) processes that particular data signal field, and generates an output signal to a display sign at the fueling site to inform customers of the price from a distance.

Figure 6:
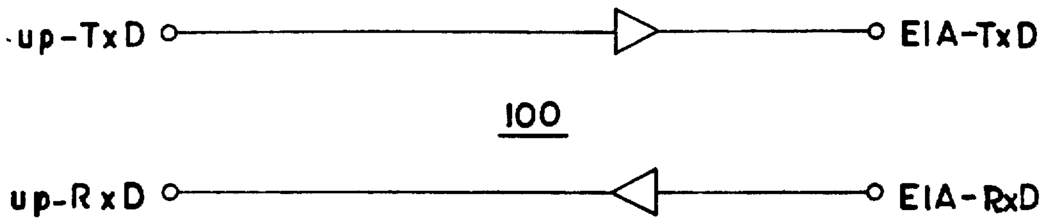
FIG. 6 is schematic diagram of the RS-232 circuit.

In the illustrative embodiment, the microprocessor output signals are fed to a RS-232 circuit (100), shown in FIG. 6, for transformation into a signal form readable by the sign. The RS-232 circuit (100) communicates with microprocessor (70) through input-output port (90) in a per se conventional manner. In effect, RS-232 circuit (100) converts serial signals from microprocessor (70) into RS-232 signals, which control the sign.

In other embodiments, separate element (100) would not be required in that the microprocessor (70) could incorporate as an integral part thereof circuity to communicate directly with the device to be controlled (110), for example, the display sign.

Figure 7:
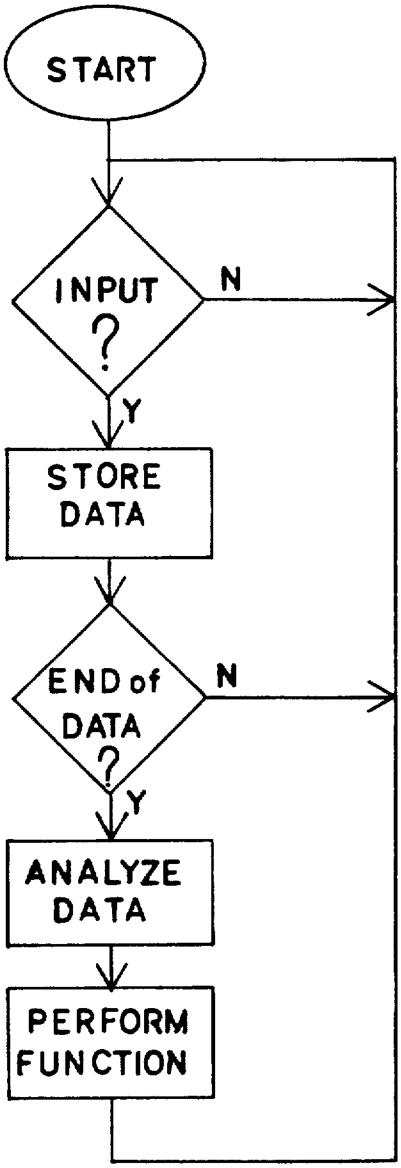
FIGS. 7 and 8 are flow charts for overall system processing for the data signal monitoring system.
Figure 8:
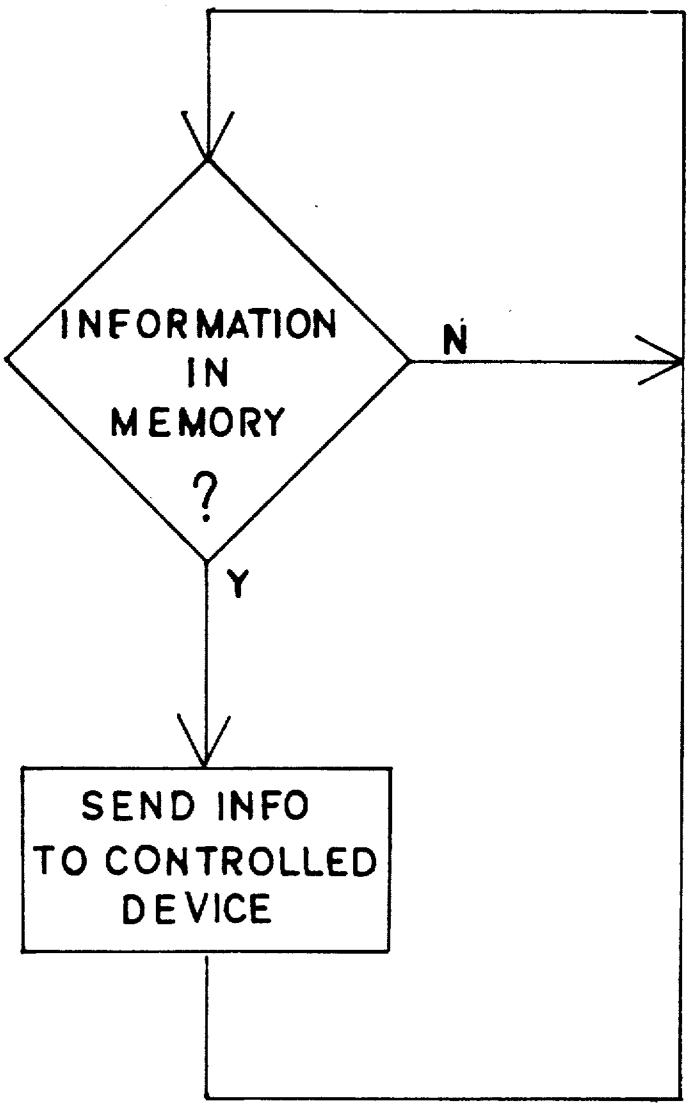

Referring now to FIG. 7, there is shown in flow chart form program processing, contained in RAM (76). When data is presented, the data is stored until the end of data presentation. Thereafter, the data is analyzed and the function performed. Referring now to FIG. 8, there is shown in flow chart form ROM (75) program control.

Having discussed above the operation of the signal monitoring device (40), attention is now directed toward examples of use at a fueling site. In the industry, it is common practice to display the price per gallon of the fuel being sold on an electrical sign located at the fueling site. Typically, such signage is located on a pole located in view of the traveling public. The price display on the sign is large enough such that it can be seen from a distance. In this embodiment, the microprocessor (70) of the data signal monitoring system (40) controls the signage price display. During operating, the price per gallon of the fuel is entered into control console (20), and this information is communicated to dispensers (11-13) through wire (15). Configuration circuit (30) extracts this information from the data wire (15), and transfers the price information to microprocessor (70) along with other information from the wire (15). The program control selector (80) instructs the microprocessor (70) to process data relating price, and to discard other data not relating to price. From the price information data, the microprocessor (70) generates an output signal to the signal convertor (100) which, in the illustrative embodiment, generates an RS-232 signal to the display sign. By this method, the microprocessor (70) continuously and automatically controls the price signage display from information entered into control console (20).

In an alternate embodiment, the data monitoring device (40) is used to activate an audio device for delivering an audio message at the pump island (10). For example, the message may be instructions on the dispensing process, or a promotional message for other products. In this case, the controlled device (110) would be a device for playing a pre-recorded message. Since it is desirable to deliver the message only when a customer activates the dispensers (11-13), (as opposed to delivering the message in a random manner), the data monitoring system (40) monitors the data wire (15) for pump activation as previously discussed. In this case, program control selector (80) instructs microprocessor (70) to process only information relating to pump activation, and to discard other information. The microprocessor (70) then sends an output signal to a pre-recorded message player causing activation and delivery of the message. Pre-recorded message players are well known in the art, and commercially available. The player could be located in a building at the fueling site with a speaker positioned at the pump island (10). Where there are multiple pump islands, a speaker could be positioned at each island for delivering messages corresponding to activation of pumps at that island. Music could be delivered through the speaker when the message was not in progress.

The above described invention relates to a method and device for monitoring data signals in a data wire. While the invention has been described in the manner presently conceived to be most practical and preferred embodiment thereof, it will be apparent to persons ordinarily skilled in the art that modifications may be made thereof within the scope of the invention, which scope is to be accorded the broadest interpretation of the claims such as to encompass all equivalents, devices, and methods.

What is claimed is:

1. A data signal monitoring system having microprocessor for monitoring data signals in a data wire without interrupting data signal flow, where said microprocessor then controls other devices from information extracted from said data wire, comprising:

(a) a configuration circuit, attached to said data wire to be monitored, having opto-coupler means for coupling and isolating said data wire from said data signal monitoring system allowing data signals to be monitored without interruption, where said opto-coupler generates computer logic signals corresponding to said data signals;

(b) a microprocessor including plural input-output ports, programmable read and write only memory, programmable read and write variable memory, said microprocessor having bus means connecting said configuration circuit with at least one of said microprocessor ports for receiving said computer logic signals from said configuration circuit;

(c) a programmable switch selector having bus connection to at least one of said microprocessor ports for instructing said microprocessor as to which of said computer logic signals to select and process, and which of said computer logic signals to discard, where said microprocessor generates output signals corresponding to said selected and processed signals; and (d) a converter means having bus connection to at least one of said input-out ports, for transforming said output signals to signals readable by an electrical device to be controlled, whereby said microprocessor controls said device from information extracted from said data wire.

2. A data signal monitoring system as recited in claim 1, wherein: said opto-coupler means includes a light emitting diode and transistor for transforming said data signals into transistor-transistor logic signals.

3. A data signal monitoring system as recited in claim 1, wherein: said data wire is between a fuel dispenser and a fuel dispenser control unit.

4. A data signal monitoring system as recited in claim 3, wherein: said data signal being selected and processed are data signals corresponding to price per gallon of the fuel.

5. A data signal monitoring system as recited in claim 3 wherein said data signals being selected and processed are data signals corresponding to said dispenser authorization.

6. A data signal monitoring system as recited in claim 3, wherein: a first said configuration circuit is attached to said data wire for monitoring data signals sent to said dispenser from said dispenser control system, and a second configuration circuit is attached to said data wire for monitoring data signals sent from said dispenser to said dispenser control unit.

7. A data signal monitoring system as recited in claim 1, wherein: said converter means includes a RS-232 circuit for transforming said microprocessor output signal to a RS-232 signal for controlling said electrical device.

8. A microprocessor controlled method for monitoring data signals in a data wire without interrupting data signal flow, comprising the steps of:

(a) feeding the data signals into a configuration circuit connected to said data wire, said configuration circuit having an opto-coupler with light emitting diode and transistor for coupling said microprocessor to said data wire for allowing the current to be monitored without interrupting data signal flow in said wire;

(b) sampling said data signals by said light emitting diode and transferring this information to said transistor for generating computer logic signals corresponding to said data signal;

(c) feeding said computer logic signals to said microprocessor having ROM and RAM memory through an input-output port;

(d) causing said microprocessor to parse said computer logic signals including to select and decode designated data signals, and discard undesired data signals, where selection is controlled by a programmable switch control input unit, and further causing said microprocessor to generate output signals corresponding to selected and processed data signals; and (e) feeding said microprocessor output signals to an electrical apparatus to be controlled, where said microprocessor controls said apparatus from information extracted from said data wire.

9. The method as recited in claim 8, wherein: step (a) is practiced by connecting said configuration circuit to a data wire between a fuel dispenser and a dispenser control unit.

10. The method as recited in claim 8, wherein: step (a) is practiced by connecting said configuration circuit to a data wire between a fuel dispenser and a dispenser control unit, and step (d) is practiced by programming said switch control unit to cause said microprocessor to process data signals corresponding to price per gallon of the fuel, and to discard other data signals.

11. The method as recited in claim 8, wherein: step (a) is practiced by connecting said configuration circuit to a data wire between a fuel dispenser and a dispenser control unit, and step (d) is practiced by programming said switch control unit to cause said microprocessor to process data signals corresponding to pump activation, and to discard other data signals, where said microprocessor causes an audio message system to be activated.

12. A data signal monitoring system having microprocessor for monitoring data signals in a data wire between at least one fuel dispenser and dispenser control system without interrupting data signal flow, where said microprocessor then controls the display on a fuel price display sign from information on fuel price extracted from the data wire, comprising:

(a) a configuration circuit, connected to said data wire, having opto-coupler means with light emitting diode for sampling said data signals and a transistor for generating computer logic signals corresponding to said data signal which allows said data signal to be monitored without interrupting signal flow in said data wire;

(b) a microprocessor having plural input-output ports, programmable read and write only memory, programmable read and write variable memory, said microprocessor having bus connection to said configuration circuit with at least one of said microprocessor ports for receiving said computer logic signals;

(c) a programmable switch selector means having bus connection to at least one of said microprocessor ports for instructing said microprocessors to select and process said computer logic signals corresponding to fuel price, and to discard all other computer logic signals, where said microprocessor generates output signals corresponding to said selected signals;

(d) a converter means having bus connection to at least one of said microprocessor port for transforming said microprocessor output signals to signals readable by said fuel price display sign, whereby said microprocessor controls display on said fuel price signage from information extracted from said data wire.

13. A data signal monitoring system having microprocessor for monitoring data signals in a data wire between at least one fuel dispenser and dispenser control system without interrupting data signal flow, where said microprocessor activates an audio message system when the nozzle of the dispenser is lifted and the pump activated, comprising:

(a) a configuration circuit, connected to said data wire, having opto-coupler means with light emitting diode for sampling said data signals and a transistor for generating computer logic signals corresponding to said data signals which allows said data signals to be monitored without interrupting signal flow in said data wire;

(b) a microprocessor having plural input-output ports, programmable read and write only memory, programmable read and write variable memory, said microprocessor having bus connection to said configuration circuit with at least one of said microprocessor ports for receiving said computer logic signals;

(c) a programmable switch selector means having bus connection to at least one of said microprocessor ports for instructing said microprocessor to select and process said computer logic signals corresponding to pump activation, and to discard all other logic signals, where said microprocessor generates output signals corresponding to said selected signals; (d) a converter means having bus connection to at least one of said microprocessor parts for transforming said microprocessor output signals to signals readable by said audio message system, whereby said microprocessor causes activation of said audio message system from information extracted from said data wire.

* * * * *